United States Patent Office 2,791,937
Patented May 14, 1957

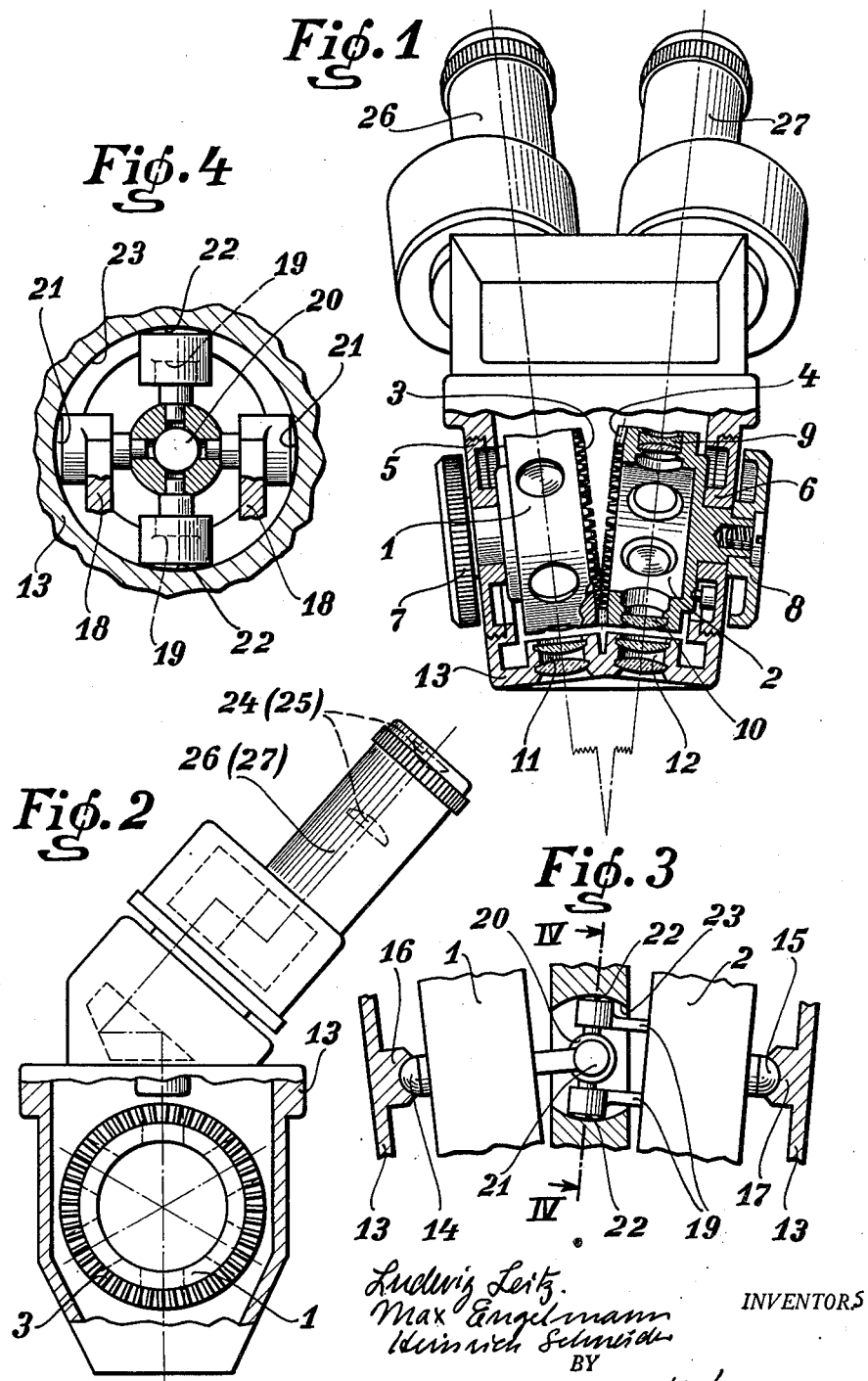

2,791,937

BINOCULAR MAGNIFYING DEVICE

Ludwig Leitz, Max Engelmann, and Heinrich Schneider, Wetzlar, Germany, assignors to Ernst Leitz, G. m. b. H.

Application March 24, 1953, Serial No. 344,282

Claims priority, application Germany March 31, 1952

1 Claim. (Cl. 88—39)

This invention relates to binocular magnifying devices and more particularly to the type which employs a plurality of intermediary systems for stepwise varying the magnifying power.

There are binocular magnifying devices consisting of two separated optical systems each of which consisting of a telescope and having a common collimator lens, the optical axes of the said two systems being parallel. These binocular magnifying devices include a plurality of intermediary systems carried by two drums which may be turned on a common shaft, the intermediary system, being provided between the common collimator lens and the telescopes. There are some disadvantages in providing a common collimator lens, e. g. some optical defects.

It is an object of the invention to provide two perfectly separated optical systems arranged under the conventional angle of convergence each of which consisting of a collimator lens, a plurality of intermediary systems of the Galilean type carried by a drum, and a telescope.

It is a further object of the invention to provide a useful coupling of the two drums carrying the intermediary systems.

The invention is diagrammatically illustrated in the accompanying drawings in which Fig. 1 is a front view of the binocular magnifying device embodying the invention, certain parts being shown in section, Fig. 2 is a side view of the binocular magnifying device, certain parts being shown in section, Fig. 3 is a front view of a cross-joint coupling of the two drums carrying the plurality of intermediary systems, Fig. 4 is an enlarged sectional view of the cross-joint coupling taken on line IV—IV of Fig. 3.

Referring to Fig. 1 two drums 1 and 2, each of which is provided with cone-shaped cog-wheels 3 and 4 respectively, are located in the bearings 5 and 6 of a housing 13. The drums 1 and 2 are inclined under the conventional angle of convergence. The drums 1 and 2, which may be turned by the knobs 7 or 8 respectively, are carrying a plurality of intermediary optical systems of the Galilean type, each of which consisting of two lens systems 9 and 10. The collimator systems 11 and 12 are located in the housing 13 in front of the drums 1 and 2 or their lens systems respectively. Two telescopes 24 and 25 are arranged in the tubes 26 and 27 connected with the housing 13 in optical alinement with the collimator systems 11 and 12 and the intermediary systems respectively.

Referring to Fig. 2 the drum 1, carrying the intermediary systems of one of the two separated optical systems of the binocular magnifying device of the present invention and being provided with the cone-shaped cog-wheel 3 is pivotally arranged in the housing 13.

One of the features and advantages of the invention is that the drums are arranged to contain at least three different intermediary systems arranged radially. The systems are identified in Fig. 2 by the dot and dash lines indicating their optical axes. Such an arrangement results in providing six different intermediary systems, which is an obvious advantage.

Referring to Figs. 3 and 4 the two drums 1 and 2 are borne in the spherical bearings 16 and 17 of the housing 13 by the spherical pieces 14 and 15 joined on the drums 1 and 2 respectively. The coupling and supporting of the drums is effected by links 18 and 19 and a cross-joint 20, which are carried in their turn in the annular spherical bearings 23 by the spherical pieces 21 and 22 respectively joined on the links 18 and 19.

If one employs the cone-shaped cog-wheel arrangement for coupling the two drums adjustment is effected by the knobs 7 and 8, whilst in employing the cross-joint arrangement for coupling adjustment is effected by the annular bearings 23.

It is to be noted that the drums are held in position by rests, well known in the art.

Although but two forms of the invention have been shown and described in detail, other forms and modifications are possible and changes may be made in the precise forms shown without departing from the spirit of the invention as defined in the appended claim.

Having described our invention what we claim is:

In a binocular microscope, a binocular magnifying device comprising two separated optical systems, each of which consists of a telescope, a plurality of intermediary optical systems of the Galilean type and a collimator lens, said intermediary systems having different magnifying powers, a housing for supporting said telescopes and having sides extending downwardly below said telescopes with a transverse bottom portion joining the housing sides, means in said bottom housing portion for fixedly supporting said collimator lenses therein, drums containing and supporting said intermediary systems, one drum for each of the said plurality of intermediary optical systems of the Galilean type, means in said housing sides for rotatably supporting said drums to rotate within said housing below said telescopes and above said collimator lenses about axes of rotation perpendicular to the optical axes of the said two optical systems, intermeshing gears on the inner adjacent sides of the drums having their planes parallel to the optical axes of the said optical systems within the drums for rotatably connecting the drums, hand knobs on the outside of said housing connected to said drums to rotate the drums for placing any one pair of the said differently powered intermediary optical systems in optical alinement with the optical axes of the microscope in relation to the said telescopes and said collimator lenses for magnifying or diminishing the microscopic view of the image of the object when said hand knobs are operated, the said separated optical systems being mounted within their respective drums with their optical axes inclined toward each other under the conventional angle of convergence.

References Cited in the file of this patent

UNITED STATES PATENTS

| | | |
|---|---|---|
| 1,236,722 | Lange | Aug. 14, 1917 |
| 1,622,350 | Sabel | Mar. 29, 1927 |
| 1,776,207 | Wagner | Sept. 16, 1930 |
| 1,914,212 | Ott | June 13, 1933 |
| 2,143,632 | Ott | Jan. 10, 1939 |
| 2,237,943 | Lihotsky | Apr. 8, 1941 |

FOREIGN PATENTS

| | | |
|---|---|---|
| 335,145 | France | Jan. 12, 1904 |
| 698,936 | Germany | Nov. 20, 1940 |